(12) United States Patent
Höfler et al.

(10) Patent No.: US 8,006,549 B2
(45) Date of Patent: Aug. 30, 2011

(54) DEVICE COMPRISING A SENSOR AND A CONNECTOR

(75) Inventors: Siegfried Höfler, Hannover (DE); Günther Singbartl, Hannover (DE)

(73) Assignee: WABCO GmbH, Hannover (DE)

( * ) Notice: Subject to any disclaimer, the term of this patent is extended or adjusted under 35 U.S.C. 154(b) by 120 days.

(21) Appl. No.: 12/312,693

(22) PCT Filed: Nov. 10, 2007

(86) PCT No.: PCT/EP2007/009751
§ 371 (c)(1), (2), (4) Date: May 20, 2009

(87) PCT Pub. No.: WO2008/083785
PCT Pub. Date: Jul. 17, 2008

(65) Prior Publication Data
US 2010/0064788 A1    Mar. 18, 2010

(30) Foreign Application Priority Data
Dec. 21, 2006  (DE) .......................... 10 2006 060 648

(51) Int. Cl.
G01L 5/28 (2006.01)
(52) U.S. Cl. .......................................................... 73/121
(58) Field of Classification Search ...................... 73/121
See application file for complete search history.

(56) References Cited

U.S. PATENT DOCUMENTS

| | | | |
|---|---|---|---|
| 2,420,291 A * | 5/1947 | Adler | 438/677 |
| 5,118,906 A | 6/1992 | Kudoh et al. | |
| 5,170,015 A | 12/1992 | Kudo et al. | |
| 5,278,496 A | 1/1994 | Dickmeyer et al. | |
| 5,381,089 A | 1/1995 | Dickmeyer et al. | |
| 5,712,562 A * | 1/1998 | Berg | 324/207.16 |
| 5,969,229 A | 10/1999 | Hori et al. | |
| 2004/0246685 A1 | 12/2004 | Barron et al. | |
| 2009/0134864 A1 * | 5/2009 | Hofler et al. | 324/173 |

FOREIGN PATENT DOCUMENTS

| | | |
|---|---|---|
| DE | 229 242 A1 | 10/1985 |
| EP | 0 432 777 A1 | 6/1991 |
| EP | 0 465 978 A1 | 1/1992 |
| EP | 0 571 129 A1 | 11/1993 |

OTHER PUBLICATIONS

"ABS/ASR 'D'—'Cab' Version Anti-Blockier-System für Nutzfahrzeuge," WABCO Standard GmbH 1999, p. 9.

* cited by examiner

*Primary Examiner* — Freddie Kirkland, III
(74) *Attorney, Agent, or Firm* — Kramer Levin Naftalis & Frankel LLP

(57) ABSTRACT

A device which comprises a sensor and/or actuator and a connector for electrically and mechanically coupling the sensor and/or actuator. The connector comprises an individual electrical conductor having a core made from a first material and having a jacket made from a second material. The first material can have a lower thermal conductivity than the second material.

15 Claims, 4 Drawing Sheets

DEVICE COMPRISING A SENSOR AND A CONNECTOR

FIELD OF THE INVENTION

The present invention relates generally to embodiments of a device having a sensor or actuator having a connector for making electrical and mechanical contact with the sensor or actuator.

BACKGROUND OF THE DISCLOSURE

Nowadays, motor vehicles, particularly trucks, have a large number of different sensors and actuators arranged around them. For operation, such sensors and actuators generally have to be connected to an open-loop control and evaluation electronic system via electrical lines. The electrical conductors which are used to connect the sensors and actuators are subject to high mechanical loads depending on the type and position of the sensor or actuator. This relates, in particular, to the region of the formation of contact between the electrical line and the housing of the sensors or actuators since the electrical conductor which comes from the outside has to be coupled there both electrically and mechanically to the internal components of the sensors/actuators. In the region where contact is made, not only does mechanical loading occur due to bending of the connecting lines but there is also thermal loading as a result of specific local thermal gradients and the different expansion behavior of the various materials.

Conventional solutions provide, for example, a high-strength copper line, the mechanical and thermal properties of which are not yet sufficient for many applications without further measures being taken. For this reason, other solutions provide pure steel lines made of a special alloy, but they are comparatively expensive to manufacture.

SUMMARY OF THE CLAIMED INVENTION

Generally speaking, it is therefore an object of the present invention to make available favorable, robust and durable devices with sensors and/or actuators which are, in particular, more resistant to thermal loading than conventional devices.

This object is achieved according to embodiments of the present invention by a device which comprises a sensor or actuator and a connector for electrically and mechanically coupling the sensor or actuator, wherein the connector includes an individual electrical conductor having a core made of a first material and a jacket made of a second material, and the first material has lower thermal conductivity than the second material. Coupling the electrical sensor or actuator by an electrical conductor in this way enables the sensor or actuator to cope significantly better with the thermal conditions in numerous applications, in particular, for example, in motor vehicles, than conventional solutions. The individual conductor can be an individual solid conductor (for example wire) or an individual conductor of a braided wire, in which case the braided wire is then typically composed of a plurality of the individual conductors according to the inventive embodiments described herein.

If heat is produced in components in the vicinity of the sensor or actuator, the heat is partially conducted away to the sensor or actuator via adjacent components and the surrounding air. However, a considerable portion of the heat is also fed in via the cable region, that is to say, the mechanical-electrical coupling. This flow of heat via the electrical feed line is also, under certain circumstances, added to the high temperatures which occur in the sensor and possibly in the connector. Airflows caused by the travel and the movement of surrounding components, typically cause the components to be cooled while the vehicle is traveling. If the vehicle comes to a standstill, the cooling air stream decreases, and peaks may briefly occur in the thermal loading of the components. This rise in the temperatures can easily persist for a relatively long time. The application of heat is considerable, in particular in the field of the brakes of motor vehicles and trailer vehicles. The inventive coupling of the sensor or actuator by means of an electrical conductor to a core made of a first material which has lower thermal conductivity provides significant advantages over conventional approaches. The application of heat via the cable, that is to say, the formation of electrical contacts, is significantly reduced in the solution according to the embodiments described herein. Improving the temperature properties also reduces the mechanical loading. Of course, it is still necessary to ensure sufficient electrical and mechanical coupling.

According to a further advantageous embodiment, the first material has higher mechanical stability than the second material. Such a device ensures that mechanical stability is achieved by providing a highly stable, mechanical core, for example made of steel. The latter is surrounded by a second material, for example copper or copper alloys, in the form of a jacket which ensures better contact to the outside by being less stable. Given a suitable size ratio of the core to the jacket, the costs for the electrical contact can be kept low. According to this embodiment, for the electrical contacts it is possible for an electrical line to have, over its entire length, a corresponding core which is made of a material which can be subjected to high mechanical loads and to also be surrounded over the entire length with the jacket made of a highly conductive and more cost-effective material. Alternatively, it is also possible to provide only relatively short sections of the electrical conductor with a core made of the mechanically more robust material. The other sections of the conductor can be constructed from the mechanically less robust second material, or from a third material with completely different properties, in so far as the respective application permits. This permits costs to be reduced. Of course, corresponding pieces of a conductor with a core can also be coupled to conventional conductors. A combination of the mechanical properties with the previously explained thermal propagation properties of the core and of the jacket is advantageous.

According to a further advantageous embodiment, the first material also has a lower coefficient of expansion. This reduces stresses and displacements in the electrical contacts.

The sensor is advantageously designed for use as a sensor in an anti-lock brake system, in particular for sensing the rotational speed of wheels.

Particularly, in this application for a sensor as described above, very high temperature peaks occur which make the inventive configuration particularly advantageous. The sensor or actuator is advantageously at least partially surrounded with an injection molded encapsulation for increasing the mechanical stability of the connector. This further increases mechanical robustness.

In one advantageous embodiment, the first material of the electrical conductor is embodied in the form of an internal conductor which has essentially a circular cross section, and the second material is embodied as an external conductor which encloses the internal conductor. This relates essentially to the configuration as a braided wire or individual solid conductor in a cable. If this cable is coupled to the sensor in the way described above in order to connect it mechanically and electrically to the other components, the advantage is obtained. If the ratio of the internal radius of the internal conductor to the thickness of the external conductor is selected to be between 10:1 and 1000:1, mechanical, thermal and electrical properties are advantageously matched. Neither the core nor the jacket should therefore be too thin, and, in this context, the material of the jacket can be significantly thinner than that of the core.

According to another advantageous embodiment, the device has a coupling element, in particular a coupling socket, a coupling connector or a coupling plug for electrically and mechanically coupling the electrical conductor to an electronic system for operating the sensor or actuator. Since the electrical conductor between the sensor or actuator and coupling element is equipped with a core made of a material which has lower thermal conductivity, the transmission of heat to the coupling element and to the contacts, which are, under certain circumstances, susceptible to thermal stresses, is reduced. Since these coupling elements, which may be embodied as a coupling socket, connectors, plugs etc., are usually configured only for relatively low thermal loading, the relatively low thermal conductivity has a particularly advantageous effect.

According to a further advantageous embodiment, the thermal conductivity of the core is lower than that of the jacket by approximately a factor of 7. Also, according to a further embodiment, the electrical contacts are made from a braided wire with a fixed number of individual conductors, each of which has a thickness which does not exceed approximately 0.2 millimeters. An average thickness of an individual conductor of approximately 0.185 millimeters is advantageous, each of the conductors being mainly composed of steel and having a thin layer of copper as a jacket surface.

The objectives of the present invention can also be achieved by electrical contacts for coupling an electrical conductor to a contact element of a sensor or actuator, wherein a core made of a first material and a jacket made of a second material are provided in the region of the electrical contacts, and the first material has lower thermal conductivity and can be mechanically loaded to a greater degree than the second material. The advantages according to the embodiments described herein can, to this extent, already be achieved by means of an advantageous configuration of contacts, which configuration is provided in order to be coupled to a sensor or actuator. In particular, in some applications, a large spatial extent may not be necessary in the longitudinal direction of an electrical conductor with a core and a jacket, as previously described. Instead, the advantages of the embodiments described herein are already achieved by means of relatively short contacts.

A further advantageous increase in mechanical stability is achieved by encapsulating the electrical contacts by injection molding with an injection molded encapsulation.

Still other objects and advantages of the present invention will in part be obvious and will in part be apparent from the specification.

The present invention accordingly comprises the features of construction, combination of elements, and arrangement of parts which will be exemplified in the construction herein after set forth, and the scope of the invention will be indicated in the claims.

BRIEF DESCRIPTION OF THE DRAWINGS

The exemplary embodiments of the present invention will be described by way of example with reference to the accompanying drawings, in which.

DETAILED DESCRIPTION OF THE DISCLOSURE

Figure 1:
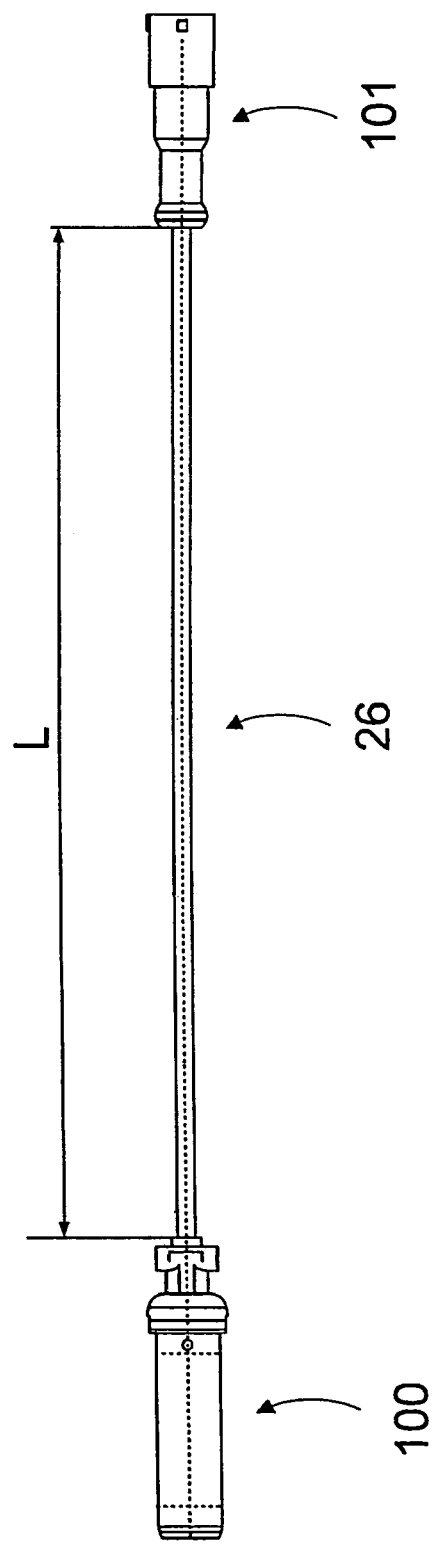
FIG. 1 is a plan view of an inventive device according to embodiments of the present invention.

FIG. 1 is a simplified view of a device which is configured according to an advantageous embodiment of the present invention. A sensor 100, which is shown by way of example, is connected, by means of a connector, to other components for attaching, reading out and operating the sensor. The connector comprises an electrical conductor 26 and a connector 101, for example a plug, a connector or a socket. The electrical conductor 26 comprises, according to embodiments of the present invention, one or more individual conductors (which are described in more detail with reference to FIGS. 4(a) and 4(b)) which have a core made of a first material (for example, in the form of an internal conductor) and a jacket made of a second material (for example, in the form of an external conductor). Both braided conductors and individual solid wires can advantageously be used. Accordingly, either the individual wire of a braided conductor or the entire individual solid wire has the core comprised of the first material and the jacket comprised of the second material.

According to embodiments of the present invention, the first material has lower thermal conductivity than the second material of the jacket. Overall, this provides the electrical conductor with lower thermal conductivity than in conventional solutions in which the wire is composed of a single material (for example, copper). According to embodiments of the present invention, for example, steel is suitable as the material for the core, and copper as the material for the jacket. Conventional solutions are typically composed of pure copper. The suitable selection of material for the core and the jacket over at least one section of the length L of the connector (for example, the electrical conductor 26) ensures that the propagation of heat in the sensor 100, the electrical conductor 26 and the connector 101 is advantageously reduced. The length can advantageously be approximately 20 or 50 centimeters or more for use in an anti-lock brake system ("ABS"). In this way, for example, heat which is introduced into the electrical conductor 26 is not transmitted in the same way to the connector 101 and to the sensor 100. This is advantageous, in particular, because such connectors 101 are frequently configured only for lower temperatures than the other components.

A further advantageous aspect of the embodiments described herein can then be achieved if the core made of the first material has a higher mechanical stability than the jacket made of the second material. With steel (core) and copper (jacket) both the advantageous lower thermal conductivity and the improved mechanical stability are obtained. The coefficients of expansion of these two materials also have favorable effects, and the increased conductivity of a jacket made of copper is also advantageous. In the case of conductors made of steel and copper, a number of advantages are therefore provided at the same time, with each of the aforesaid aspects, that is to say, the thermal conductivity, mechanical load bearing capacity, expansion behavior and electrical conductivity making their own advantageous contributions, and a number of the aspects advantageously interacting in a synergetic fashion, for example in particular in the case of ABS sensors.

The advantageous aspects of the embodiments of the present invention will be described below for an automatic brake system sensor 100. In the case of a braking process, heat is fed into the region of the sensor 100 and in the cable region 26. The heat which is generated by the brakes occurs in an enduring fashion or briefly depending on the activation of the brake system. The maximum temperatures are found to occur after a relatively long downhill journey with braking phases and a subsequent stationary state of the vehicle. In such a situation, the slipstream suddenly occurs and a temporary, marked rise in the temperatures occurs, which rise can last for several minutes and even up to 20 minutes. Particularly, in this situation, the thermal conductivity of steel, which is lower by approximately a factor of 7, compared to conventional copper lines, has a very advantageous effect because the feeding in of heat into the sensor via the cable, i.e., to be more precise, into the sensitive coil or the sensitive contacts of the sensor, is significantly reduced. This flow of heat via the electrical feed line 26 is added to the high temperatures which already occur in the sensor, making the advantageous refinement of the sensor according to embodiments very significant.

The sensor illustrated in FIG. 1 has various application areas and therefore temperature ranges for the three illustrated components, specifically the sensor 100, the connectors 101 and the electrical conductor 26. Within the sensor 100, a distinction is made between continuous temperatures of, for example, −40° C. to +150° C., and a short-term temperature of +180° C., for which the sensor 100 has to be designed. The term "short-term" refers here to approximately one hour. In the field of trucks, the electrical conductor 26 is frequently given higher specifications, i.e., a specification for a continuous temperature of +180° C. and +220° C. during short-term operation. This is due to the fact that the electrical conductor 26 often has to be laid in the vicinity of brake disk drums. The permitted thermal application ranges of the electrical connector 101 are frequently comparatively lower, specifically, in the range from −40° C. to +80° C. This is due to the fact that these coupling elements are normally arranged outside the regions in which relatively high temperatures occur or are produced. However, the invention recognizes that the transmission of heat via the electrical conductor 26 to the connector 101, and, as a result, also to further, thermally susceptible components of the vehicle, can have a damaging influence because the basic thermal configuration of these elements is lower.

In general, lower thermal loads at the temperature peaks which occur briefly from the outside are brought about both at the sensor 100 and at electrical contacts as such owing to the relatively low thermal conductivity and the relatively high mechanical load bearing capability. As a result, the mechanical loading of the device according to embodiments of the invention with a sensor 100 and the electrical contacts is also reduced. The different and overall lower coefficients of expansion of the steel also have an additional positive effect on the contacts because relative stresses and displacements within the electrical contacts or within the electrical conductor 26 are alleviated. Also, the relatively high thermal conductivity of the copper layer in relation to the electrical conductivity of the overall arrangement has a positive effect. An advantageous value of the electrical length resistance of 80 to 90 Ohm/km can be achieved in this way.

Figure 2:
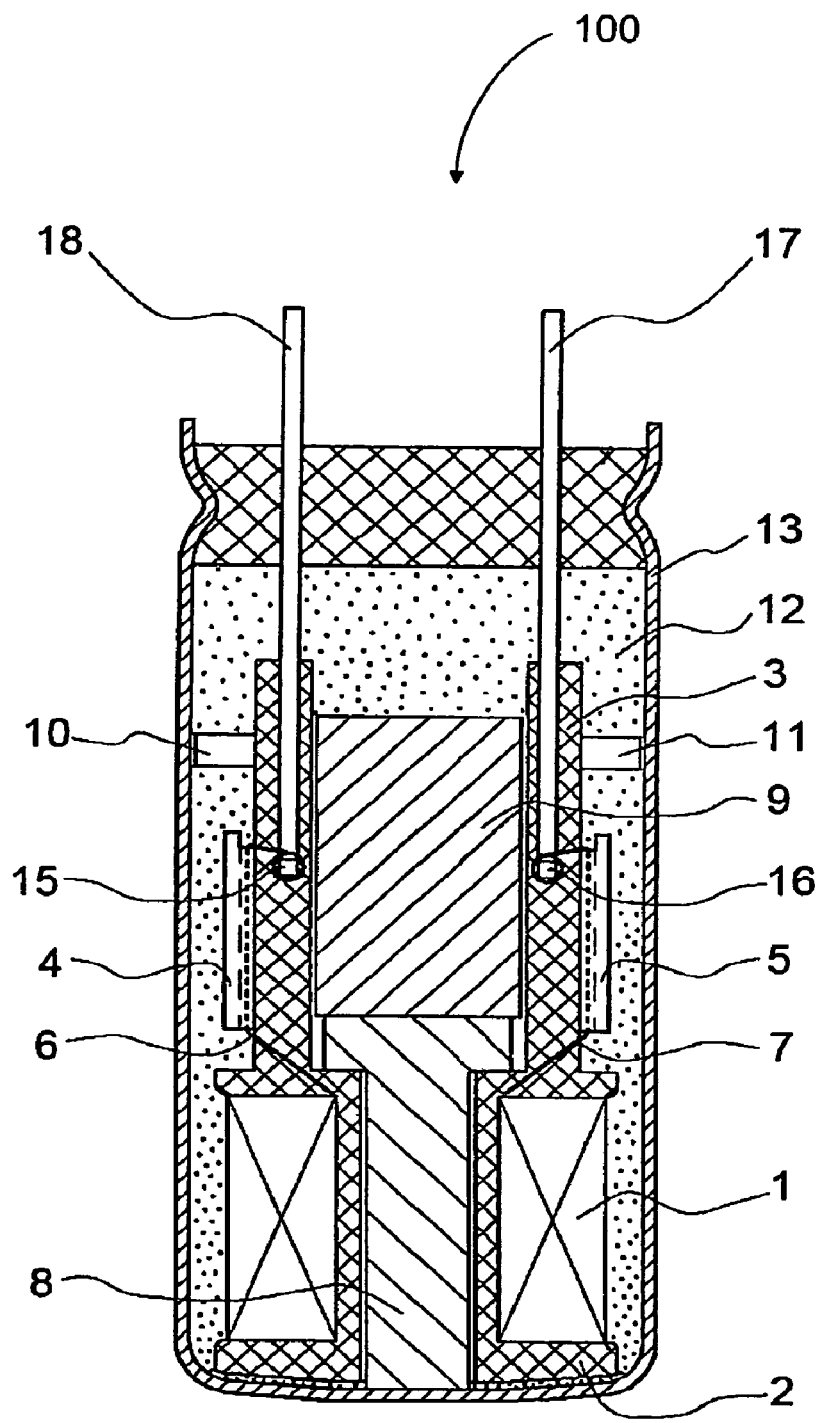
FIG. 2 is a simplified cross-sectional view through an exemplary sensor according to embodiments of the present invention.

FIG. 2 shows a sectional view through a sensor 100, which is used, by way of example, to describe the electrical contacts according to an exemplary embodiment. The sensor 100 has an electrical coil assembly 1, 2, 3 with a coil former 2, onto which an electrical coil winding 1 made of wire is wound. First and second wire ends 6, 7 are led out of the coil winding 1 to electrical connecting points 15, 16 and are electrically connected, for example, soldered or welded, there, to these connecting points. The connecting points 15, 16 are electrically connected to connecting elements 17, 18 or embodied in one piece therewith. The connecting elements 17, 18 are used to electrically couple the sensor to an electronic evaluation unit, for example to the control unit of an anti-lock brake system. The connecting elements 17, 18 are manufactured, for example, from a strip of sheet metal or from square wire. Guide elements 4, 5, which are used to attach and guide the wire end which is led out of the coil winding 1, are also illustrated. A permanent magnet 9 and a stepped pole pin 8 made of material which is a good magnetic conductor, are arranged within the coil assembly 1, 2, 3. The previously described components of the sensor are encapsulated by injection molding in a specific injection molding encapsulation tool with an injection molded encapsulation 12 during the manufacture of the sensor. A thermoplast, in particular a polyamide material, can advantageously be used as the injection molded encapsulation. The injection molded encapsulation 12 has the advantage that the components which are encapsulated by injection molding are better protected against mechanical damage and moisture than if the injection molded encapsulation is not used. A further increase in the mechanical strength can be achieved by using injection molded encapsulations which are reinforced by glass balls and/or alternatively reinforced by glass fibers. In particular, the reinforcement by glass fibers permits a further significant increase in the mechanical stability. The encapsulation by injection molding has the further advantage that the pole pin 8 and the permanent magnet 9 are fixed as a result.

The unit which is encapsulated by injection molding in this way is arranged in a pot-like housing 13. The housing 13 can be embodied, for example, as a deep drawn part made of metal. The housing 13 is closed off in a moisture-tight fashion by a closure element (not illustrated) which is pressed in a positively locking fashion into the housing 13 which is open on one side. Furthermore, barriers 10, 11, which are arranged between the wire end 6, 7 which is led out of the coil winding 1 and the injection point of the injection molded encapsulation 12 during the process of encapsulation by injection molding are provided. The barriers cause the direction of flow of the injection-molded encapsulation material to be deflected (not illustrated here in more detail). In the case of sensors, such as illustrated in FIG. 1, the housing is generally a pot-like steel housing which surrounds in a protective fashion the underside of the region of the sensitive sensor parts, such as, for example, coil, body, pole end, magnets, etc., which are encapsulated by injection molding. In the case of potting, potting with low-stress casting resin is also possible.

Figure 3:
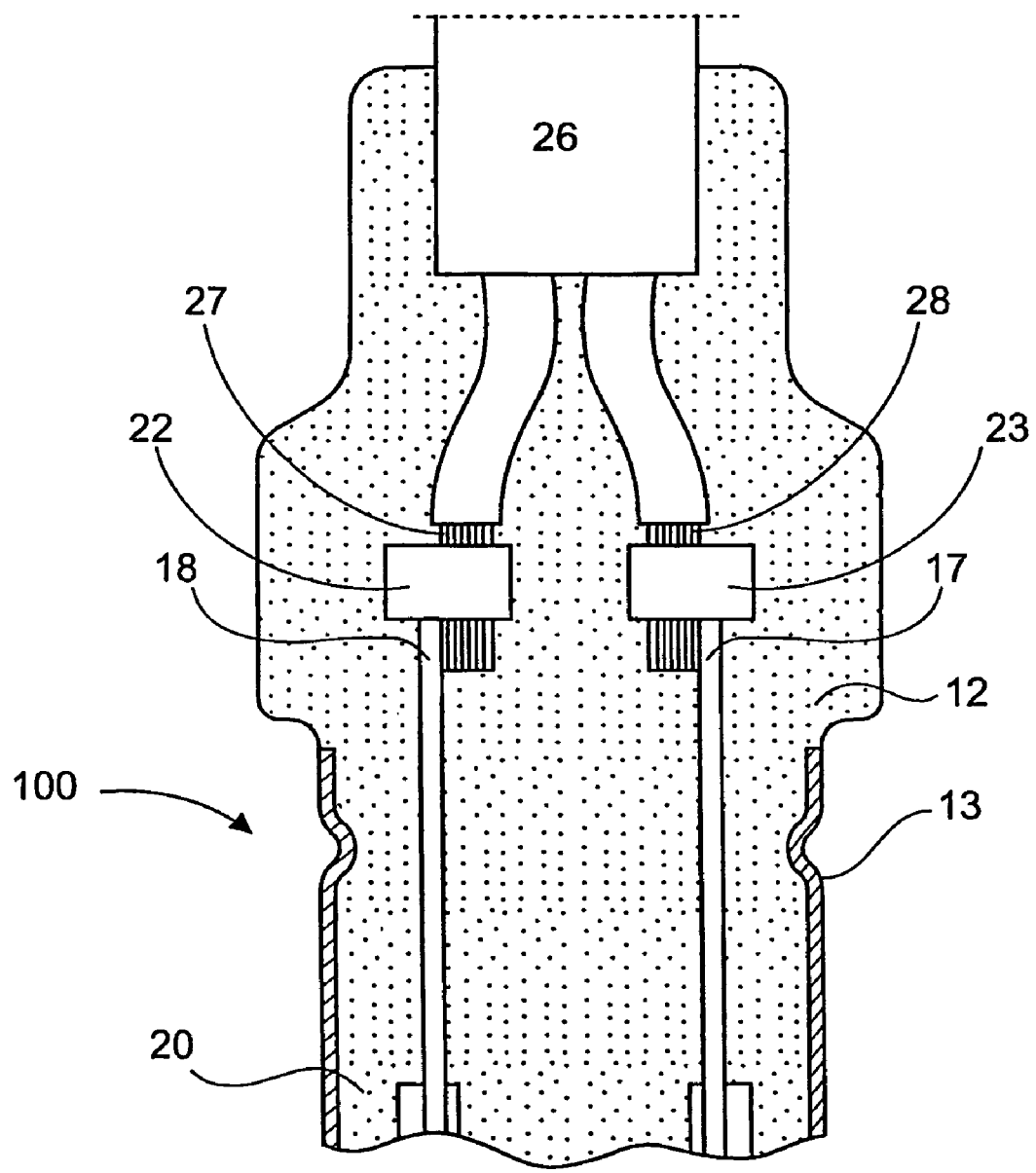
FIG. 3 is a simplified cross-sectional view through the electrical and mechanical connecting region of an exemplary sensor in accordance with embodiments of the present invention.

FIG. 3 shows an advantageous configuration of electrical contacts of the sensor according to FIG. 2 in the detail according to an exemplary embodiment of the present invention. The electrical contacts are used to make electrical and mechanical contact between an electrical conductor 26 and a sensor 100 according to FIGS. 1 and 2, which is an example of a plurality of sensors or actuators. The electrical conductor 26 is electrically and mechanically connected to the contact elements 22, 23 in the upper region of the sensor 100. A possible connecting technique is a crimp contact in which the ends of the electrical conductor 26, 27, 28 are connected to the contact elements 22, 23 by squeezing. The connecting elements 17, 18 form the further contacts of the coil or the coil wire. The connecting elements 17, 18 may be manufactured, for example, from copper, steel, aluminum or other electrically conductive material. The connections, i.e., the ends 27, 28 of the electrical conductor 26, the contact elements 22, 23 and the second contact elements 17, 18 are surrounded by a plastic sheath 20 which is applied by encapsulation by injection molding.

The conductor ends 27, 28 of the electrical conductor 26 are embodied according to embodiments of the invention as copper clad steel ("CCS") braided wires. The combination of the contact elements 22, 23 with the CCS braided wire in the connecting region of the electrical conductor 26 advantageously permits the mechanically and thermally stable contacts to be formed between the sensor and a corresponding electronic evaluation unit and, at the same time, high-quality electrical contacts to be formed. The physical properties of the copper promote mechanical contact through squeezing, soldering or similar connecting techniques. Owing to the copper jacket, the electrical conductor 26 is more resistant to corrosion in the connecting region than conventional electrical steel conductors. On the other hand, the mechanically more stable steel core permits the formation of contacts in a way which is resistant under high mechanical and thermal loads. In order to obtain the synergetic effects of the combination of steel and copper, the conductor ends 27, 28 of the electrical conductor 26 can advantageously be embodied as braided wires or as individual solid conductors. The material thickness of the steel—that is to say of an individual core or of a plurality of cores in one braided wire—should be sufficiently large. In addition, it is possible to provide that the proportion of copper (i.e., the thickness of the copper jacket) is given sufficiently large dimensions in order to permit sufficient deformation of the copper braided wire even when the line is squeezed. In order to illustrate the relationships between the internal diameter of the steel core and the thickness of the copper jacket, a number of exemplary embodiments will be described below using specific numerical values. However, it is to be noted that the advantages of the present invention can be achieved even if materials other than copper and steel, which have similar physical properties, are used. In addition, it is possible to deviate from the given numerical values to a certain degree without losing the advantages of the present invention.

Figure 4:
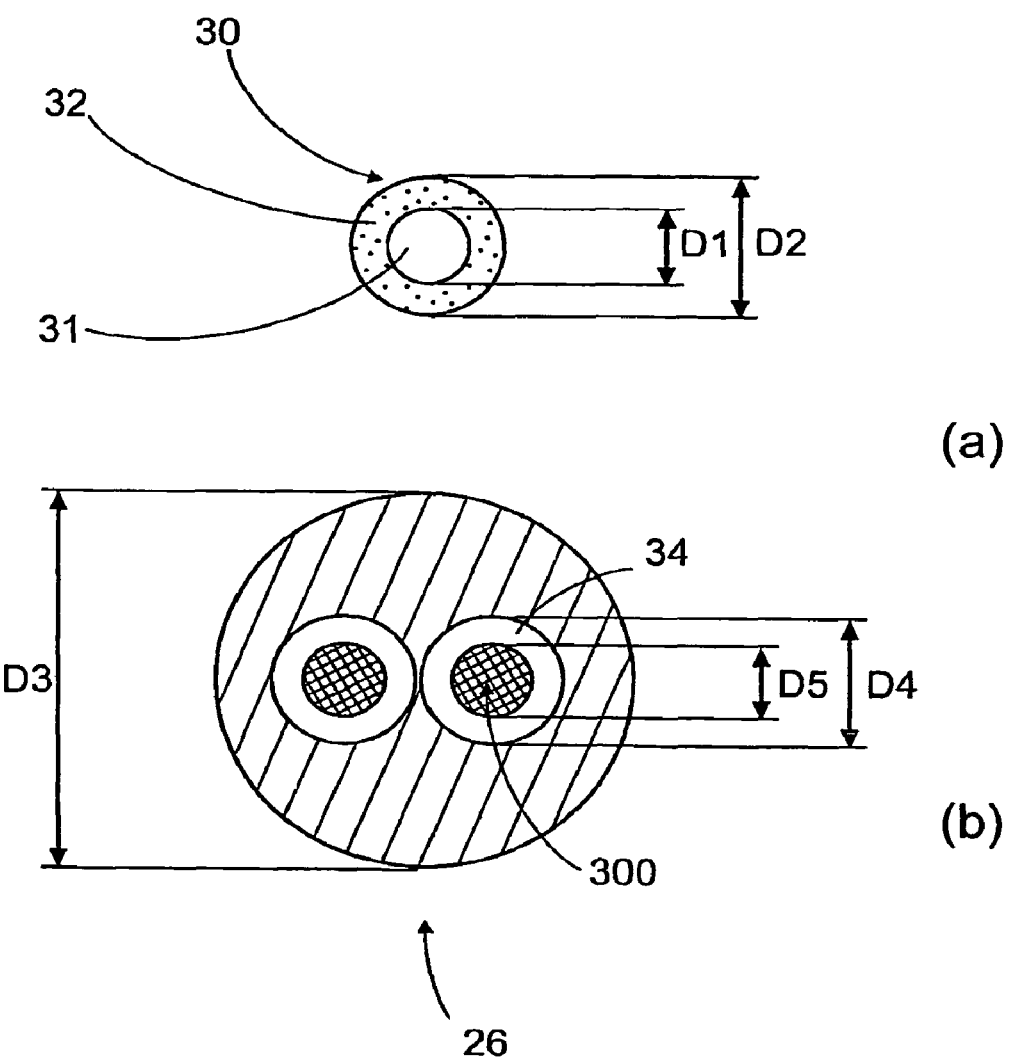
FIG. 4(a) is a cross-simplified sectional view through an individual electrical conductor for forming electrical contacts according to an exemplary embodiment of the present invention.
FIG. 4(b) is a simplified cross-sectional view through an electrical conductor according to an exemplary embodiment of the present invention.

FIG. 4(a) shows, by way of example, a cross section through an individual electrical conductor 30 of a braided wire, which individual conductor 30 can be used to form electrical contacts according to the present invention. The individual conductor has a core 31 with a diameter D1 and a jacket 32 with a diameter D2. The core can advantageously be made of steel and the jacket of copper or a copper alloy. The jacket can be made very thin for most applications, with the result that a ratio of D1 to (D2–D1) of more than 10 to 1 is obtained. The properties of the materials and of the core and the jacket have already been described with reference to FIG. 1 and they apply correspondingly to the individual conductor from FIG. 4(a).

FIG. 4(b) shows, by way of example a cross section through an electrical conductor 26 according to an advantageous embodiment of the present invention. The configuration of the conductor 26, which is discussed below, is located at least in a last section of the electrical conductor. Furthermore, according to embodiments of the present invention, it is possible to make available an electrical conductor 26 of any desired length, which has the corresponding advantageous properties (i.e., the corresponding cross sections) over the entire length. The criteria on which the dimensioning of the braided wire according to embodiments of the present invention is based advantageously comprise the following aspects: the durability with respect to flexing cycles, impact resistance when cable binders are mounted, resistance to oscillation, tightness of the injection molded encapsulation of a sensor or actuator with the inventive contacts and their low contact resistance. According to FIG. 4(b), the electrical conductor 26 is composed at one end (27 or 28 according to the illustration in FIG. 2) of a braided wire 300 which has a plurality (for example advantageously 19 or 20) of individual conductors 30 each with a core 31 made of a mechanically robust material such as, for example, steel, and a thin jacket 32 made of a softer material such as, for example, copper. The electrical conductor 26 advantageously has a diameter D3 of between, for example, 4 millimeters and 4.5 millimeters. The braided wire 300 has, with the insulation 34, a diameter D4 of approximately 1.5 millimeters. The diameter D5 of the braided wire itself is approximately 1 mm.

The braided wire 300 is located, for example, in the contact element 22, 23 (illustrated in FIG. 3) in order to make available the electrical contacts according to embodiments of the present invention. The contact element 22, which may be composed of steel, aluminum, copper or the like, and the conductor end 27 are deformed by mechanical pressure and, as a result, a close mechanical and electrical connection is produced between them. The copper jacket 32 of the individual conductors 30 of the braided wire 300 can be deformed from an approximately circular cross section by virtue of the external pressure which is applied via the contact element 22. In contrast, the core 31 of the individual conductors 30 of the braided wire remains virtually unchanged. This advantageous effect of the invention is brought about by virtue of the fact that the core 31 has a higher degree of mechanical stability than the copper jacket 32. On the other hand, the diameters of the braided wire 300 according to embodiments of the invention are selected such that the aforementioned effect may occur. The better electrical conductivity of the copper jacket 32 has a positive effect insofar as a low contact resistance is produced between the contact element 22 and the braided wire 300. Alternative ways of forming contacts apart from crimping are also contemplated, such as, for example, welding, which is advantageously possible in particular for the steel core 31. In addition, what is referred to as resistance welding can also be carried out by means of "hot staking". By applying pressure via a screw or the like, further advantageous contact forming possibilities are obtained according to the principle of an insulating screw joint. Likewise, solutions are conceivable in which one or more connecting techniques are combined with other connecting techniques. It is therefore conceivable, for example, that the contacts are partially soldered or welded and in addition mechanical stability is produced by means of a crimp contact or a screw contact. All the forms of contact benefit from the configuration according to embodiments of the present invention.

The foregoing discussion relates mainly to a core and a jacket of an electrical-mechanical connection. The advantages of the present invention can, however, also be obtained by using a plurality of cores (for example as a plurality of internal conductors), or one core with a plurality of jackets in the form of a sequence of layers. The selection of the materials for the core and the jacket is decisive. Depending on the method of forming contacts, precisely reverse selections of the materials can also be made, with the result that the lower thermal conductivity of the core is instead provided by the jacket. Instead of a braided wire it is also possible to select an individual solid conductor.

It will thus be seen that the objects set forth above, among those made apparent from the preceding description, are efficiently attained, and since certain changes may be made without departing from the spirit and scope of the invention, it is intended that all matter contained in the above description or shown in the accompanying drawings shall be interpreted as illustrated and not in a limiting sense.

It is also to be understood that the following claims are intended to cover all of the generic and specific features of the embodiments herein described and all statements of the scope of the invention that, as a matter of language, might be said to fall there between.

What is claimed is:

1. A device comprising:
   a sensor; and
   a connector for electrically and mechanically coupling the sensor to an electronic system, the connector including at least one individual electrical conductor having a core made of a first material and a jacket made of a second material, the first and second materials being selected based at least in part on reducing propagation of heat in the sensor and the connector, and a ratio of a radius of the core to a thickness of the jacket being one of greater than and equal to about 10:1, the first material having a lower thermal conductivity than the second material.

2. The device of claim 1, wherein the first material can be mechanically loaded more than the second material.

3. The device of claim 1, wherein the first material has a lower thermal coefficient of expansion than the second material.

4. The device of claim 1, wherein the second material has a higher electrical conductivity than the first material.

5. The device of claim 1, wherein the sensor is operable to sense a rotational speed of wheels for an anti-lock brake system.

6. The device of claim 1, wherein the sensor is at least partially surrounded with an injection molded encapsulation for increasing a mechanical stability of the connector.

7. The device of claim 1, wherein the first material is steel and the second material is one of copper and a copper alloy.

8. The device of claim 1, wherein:
   the first material is an internal conductor for the at least one individual electrical conductor and has a substantially circular cross-section; and
   the second material is as an external conductor for the at least one individual electrical conductor and encloses the internal conductor.

9. The device of claim 1, wherein the connector comprises one of a coupling socket and a coupling plug for coupling the at least one individual electrical conductor to the electronic system for operating the sensor.

10. The device of claim 1, wherein the at least one individual electrical conductor is a wire.

11. The device of claim 1, wherein the connector further includes a plurality of individual electrical conductors, and wherein each individual electrical conductor of the plurality of individual electrical conductors has a core made of the first material and a jacket made of the second material.

12. The device of claim 11, wherein the plurality of individual electrical conductors are braided into a braided wire.

13. The device of claim 1, further comprising:
   an actuator coupled to the connector.

14. The device of claim 1, wherein the connector has first and second ends.

15. The device of claim 14, wherein the at least one individual electrical conductor is included in only the first and second ends of the connector.

* * * * *